United States Patent [19]

Choi

[11] Patent Number: 5,768,244
[45] Date of Patent: Jun. 16, 1998

[54] OPTICAL PICKUP SYSTEM HAVING AN INTEGRATED TWIN FOCUSING BEAM SPLITTER

[75] Inventor: Yang-Oh Choi, Seoul, Rep. of Korea

[73] Assignee: Daewoo Electronics Co., Ltd., Seoul, Rep. of Korea

[21] Appl. No.: 753,522

[22] Filed: Nov. 26, 1996

[30] Foreign Application Priority Data

Nov. 27, 1995 [KR]   Rep. of Korea ........................ 95-43818

[51] Int. Cl.[6] ............................... G11B 7/00; G02B 6/12
[52] U.S. Cl. ........................ 369/112; 385/14; 385/129
[58] Field of Search ..................... 369/44.11, 44.12, 369/103, 109, 110, 112; 385/14, 31, 33, 129, 130, 131

[56] References Cited

U.S. PATENT DOCUMENTS

| | | | |
|---|---|---|---|
| 4,866,694 | 9/1989 | Korth | 369/110 X |
| 4,945,525 | 7/1990 | Yamamoto et al. | 369/44.12 |
| 4,971,414 | 11/1990 | Funato et al. | 369/112 X |
| 5,070,488 | 12/1991 | Fukushima et al. | 369/103 X |
| 5,105,403 | 4/1992 | Kando et al. | 369/109 X |
| 5,195,070 | 3/1993 | Shiba et al. | 369/112 X |
| 5,200,939 | 4/1993 | Nishiwaki et al. | 369/112 X |
| 5,208,800 | 5/1993 | Isobe et al. | |
| 5,317,551 | 5/1994 | Shiono | 369/103 X |
| 5,428,584 | 6/1995 | Yoshida et al. | |
| 5,446,719 | 8/1995 | Yoshida ey al. | |
| 5,450,237 | 9/1995 | Yoshida et al. | 369/112 X |
| 5,481,386 | 1/1996 | Shimano et al. | 369/112 X |
| 5,583,843 | 12/1996 | Horinouchi. | |
| 5,621,715 | 4/1997 | Ohyama. | |

*Primary Examiner*—Paul W. Huber
*Attorney, Agent, or Firm*—Pennie & Edmonds, LLP

[57] ABSTRACT

An integrated optical pickup system for reproducing an information signal stored on a recording surface of an optical disk is comprised of a first optical glass substrate, integrated with a semiconductor laser, a reflection collimating lens, a transmission off axis diffractive object lens and a reflection layer, for impinging a converged light beam onto the optical disk and collimating the converged light beam after being reflected from the recording surface and a second glass substrate, integrated therein with a twin focusing beam splitter and a photo detector, for guiding the collimated light beam from the first glass substrate to the photo detector, thereby allowing the integrated optical pickup system to reproduce the information signal off the recording surface of the optical disk.

20 Claims, 3 Drawing Sheets

OPTICAL PICKUP SYSTEM HAVING AN INTEGRATED TWIN FOCUSING BEAM SPLITTER

FIELD OF THE INVENTION

The present invention relates to an optical pickup system; and, more particularly, to an integrated optical pickup system of a size reduced by integrating its various optical components on a pair of glass substrates.

DESCRIPTION OF THE PRIOR ART

As is well known, an optical pickup device is one of the most important components in an optical-disk memory system; and has been introduced and used in various type. Unfortunately, however, this optical pickup devices of the prior art have the deficiency of requiring numerous bulky discrete components, rendering the assembly and alignment of thereof rather complex and costly. Consequently, there have been proposed optical pickup devices having their optical components integrated on a glass substrate.

In FIG. 1, there is shown a prior art integrated optical pickup system 100 capable of reproducing an information signal from an information storage area on an optical disk 170, which is described in Shiono and Ogawa, "Planar-optic-disk pickup with diffractive micro optics", *Applied Optics*/Vol. 33, No. 31/1 November 1994. The integrated optical pickup system 100 includes: a glass substrate 110, a laser diode 120 for generating a light beam, a reflection feedback lens 130, a reflection collimating lens 140, a reflection twin focusing beam splitter 150, a transmission off-axis diffractive object lens 160, a first and a second reflection layers 180, 182 and a detector 190 provided with two pairs of photoelectric cells, wherein the transmission off-axis diffractive object lens 160 is designed in such a manner that it converts a collimated light beam of a plane wave propagating with an oblique angle θ into a light of a spherical wave converging with an optical axis vertical to the glass substrate 110.

In the integrated optical pickup system 100, the light beam of the plane wave emitted from the laser diode 120 is reflected first by the reflection feedback lens 130 and then by the first reflection layer 180 onto the reflection collimating lens 140. The reflection collimating lens 140 is used for collimating the light beam from the reflection feedback lens 130 and reflecting the collimated light beam to the transmission off-axis diffractive object lens 160 via the first reflection layer 180 and the reflection twin focusing beam splitter 150. The collimated light beam transmitted through the transmission off-axis diffractive object lens 160 is focused on the optical disk 170.

The focused light beam reflected from the optical disk 170 passes through the transmission off-axis diffractive object lens 160 and impinges onto the reflection twin focusing beam splitter 150 via the first reflection layer 180, wherein the transmission off-axis diffractive object lens 160 plays the role of a collimating lens. When the light beam which travels through the transmission off-axis diffractive object lens 160 to the reflection twin focusing beam splitter 150 is reflected by the reflection twin focusing beam splitter 150, the light beam is reflected into a pair of divided light beams, wherein each of the divided light beams converges on a different focal point on the detector 190 after being reflected by the second reflection layer 182. The photoelectric cells of the detector 190 are placed at the focal points of the divided light beams, respectively, thereby allowing the integrated optical pickup system 100 to read the information signal off the recording surface of the optical disk 170.

One of the major shortcomings of the above-described integrated optical pickup system 100 is the size thereof, arising from the integration of the optical components, the reflection feedback lens 130, the second reflection layer 182, the reflection collimating lens 140, the reflection twin focusing beam splitter 150 and the transmission off-axis diffractive object lens 160 on top of the glass substrate 110, which, in turn, requires the glass substrate 110 to have a large top surface, thereby making the integrated optical pickup system 100 bulky and having a long optical path to travel.

SUMMARY OF THE INVENTION

It is, therefore, a primary object of the present invention to provide an integrated optical pickup system of a reduced size with a shorter optical path.

It is another object of the present invention to provide an optical system for detecting an information signal, wherein the information signal is used for detecting the position of an object.

In accordance with the present invention, there is provided an integrated optical pickup system for reproducing an information signal stored on a recording surface of an optical disk, comprising: a first glass substrate, having a top and a bottom surfaces, for impinging a converged light beam onto the recording surface and collimating the converged light beam after being reflected from the recording surface, wherein the top surface of the first glass substrate is in a facing relation with the optical disk; a second glass substrate having a top and a bottom surfaces, wherein the bottom surface of the first glass substrate is coupled to the top surface of the second glass substrate; a twin focusing beam splitter, integrated on the bottom surface of the second glass substrate, for splitting the collimated light beam transmitted through the first glass substrate into a first and a second divided light beams, wherein the twin focusing beam splitter includes a first and a second parts, each of the parts having a separate focal point; and a detector provided with a first and a second photoelectric cells, wherein each of the photoelectric cells is placed at each of the separate focal points of the parts of the twin focusing beam splitter, respectively, thereby allowing the integrated optical pickup system to read the information signals off the recording surface of the optical disk.

BRIEF DESCRIPTION OF THE DRAWINGS

The present invention together with the above and other objects and advantages will become apparent from the following description of preferred embodiments, given in conjunction with the accompanying drawings, wherein.

DETAILED DESCRIPTION OF THE PREFERRED EMBODIMENTS

Figure 1:
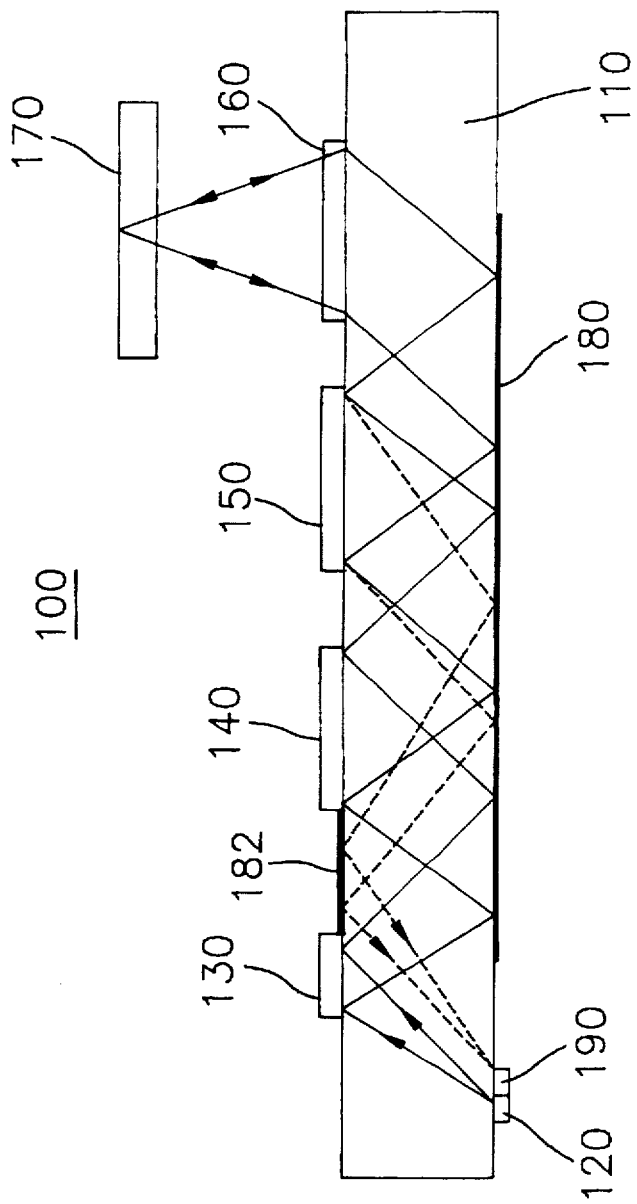
FIG. 1 represents a schematic side view of a prior art integrated optical pickup system.
Figure 2:
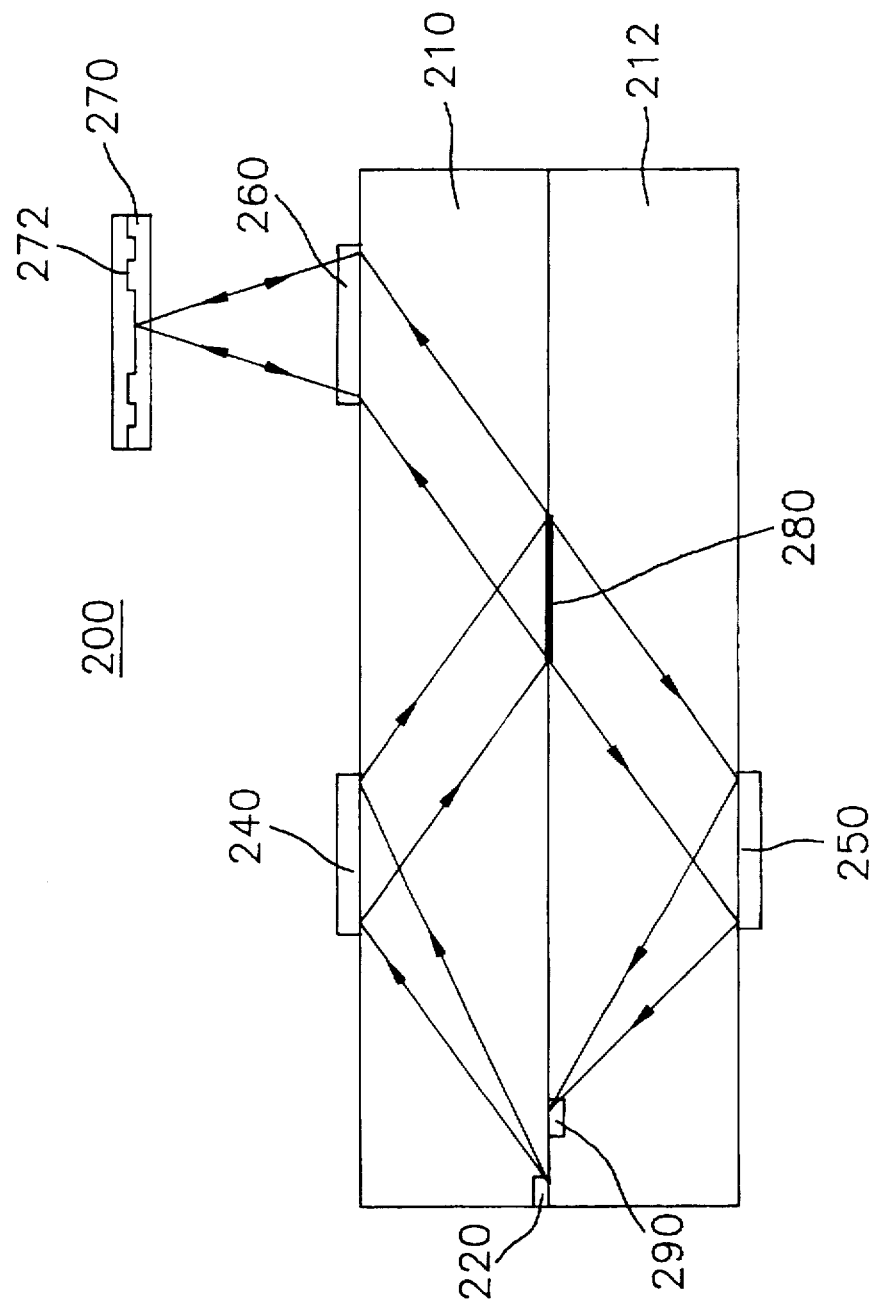
FIG. 2 shows a schematic cross-sectional view of an integrated optical pickup system in accordance with the present invention.
Figure 3:
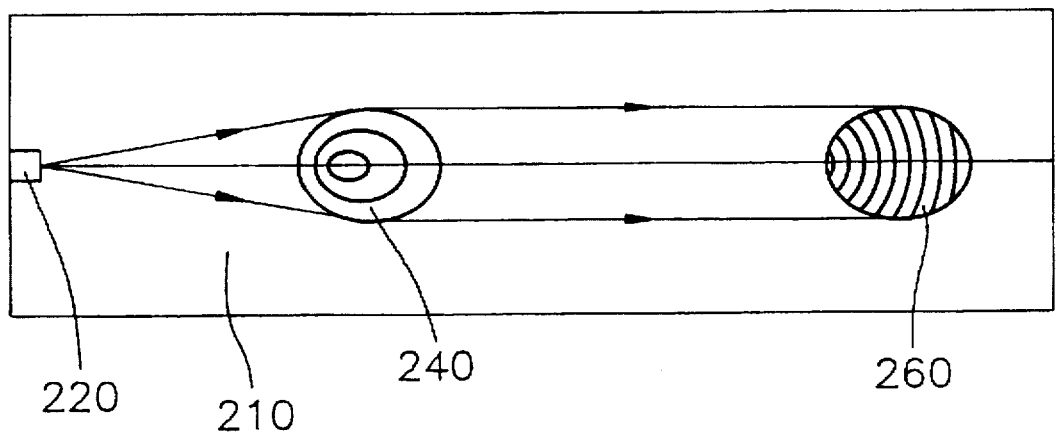
FIG. 3 presents a top view representing an optical path of a light beam in accordance with the inventive integrated optical pickup system shown in FIG. 2.
Figure 4:
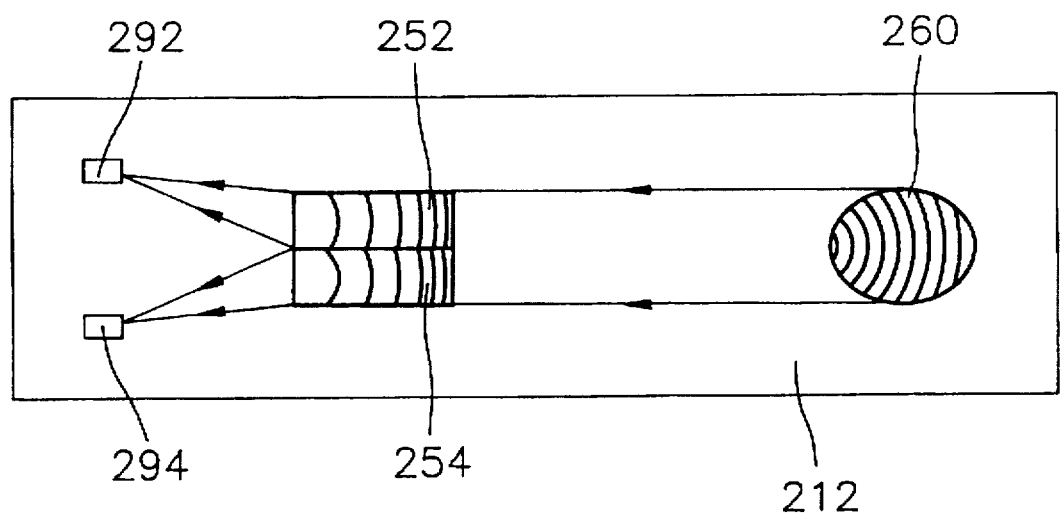
FIG. 4 depicts a bottom view representing the optical path of a light beam in accordance with the inventive integrated optical pickup system shown in FIG. 2.

There are illustrated in FIGS. 2 to 4 various views of the inventive integrated optical pickup system in accordance with a preferred embodiment of the present invention.

In FIG. 2, there is illustrated a schematic cross-sectional view of the inventive integrated optical pickup system 200 integrated with its optical components on a pair of glass substrates 210, 212. The integrated optical pickup system 200 includes: a first and a second glass substrates 210, 212, each of the glass substrate having a top and a bottom surfaces, a semiconductor laser 220 for generating a light beam, a reflection collimating lens 240, a twin focusing beam splitter 250, a transmission off-axis diffractive object lens 260, a reflection layer 280 and a photo detector 290 provided with a pair of photoelectric cells, wherein the bottom surface of the first glass substrate 210 is coupled to the top surface of the second glass substrate 212.

In the integrated optical pickup system 200, the light beam emitted from the semiconductor laser 220 impinges onto the reflection collimating lens 240 which collimates the light beam into a parallel light beam to thereby obtain a collimated light beam. The semiconductor laser 220 is attached to the bottom surface of the first glass substrate 210. The collimated light beam is reflected by the reflection layer 280 which is capable of reflecting a portion of the collimated light beam to the transmission off-axis diffractive object lens 260. The reflection layer 280 is formed on the bottom surface of the first glass substrate 210 being a predetermined distance away from the semiconductor laser 220, and the reflection collimating lens 240 is in a facing relationship with the semiconductor laser 220 and the reflection layer 280. The transmission off-axis diffractive object lens 260 is designed in such a manner that it converts the collimated light beam propagating with an oblique angle θ into a light beam converging with an optical axis formed by a center point of the transmission off-axis diffractive object lens 260 and a convergence point in the optical disk 270. A top view depicting the arrangement of the semiconductor laser 220, the reflection collimating lens 240 and the transmission off-axis diffractive object lens 260 is illustrated in FIG. 3. The collimated light beam, after passing through the transmission off-axis diffractive object lens 260, converges on the recording surface 272 of the optical disk 270. The transmission off-axis diffractive object lens 260 is integrated on the top surface of the first glass substrate 210 in a facing relation with the recording surface 272 of the optical disk 270.

The converged light beam, after being reflected from the recording surface 272 of the optical disk 270, is transmitted through the transmission off-axis diffractive object lens 260 which also plays the role of a collimating lens to thereby collimate the converged light beam. A portion of the transmitted light beam travels to the twin focusing beam splitter 250 through the reflection layer 280 which is capable of transmitting a portion of the transmitted light beam therethrough.

Referring to FIG. 4, the twin focusing beam splitter 250 includes a first and a second parts 252, 254, each part being made to have a separate focal point. The portion of the transmitted light beam, after passing through the twin focusing beam splitter 250, splits into a first and a second divided light beams. The first and the second photoelectric cells 292, 294 of the photo detector 290 are placed at the focal points of the first and the second part 252, 254 of the twin focusing beam splitter 250, respectively. Each of the photoelectric cells 292, 294 is capable of measuring the intensity of a light beam detected thereon. The first and the second divided light beams, reflected from each part of the twin focusing beam splitter 250, travel to the first and the second photoelectric cells 292, 294, respectively, thereby allowing the integrated optical pickup system 200 to reproduce the information signal off the recording surface 272 of the optical disk 270.

In comparison with the prior art integrated optical pickup system 100, the inventive integrated optical pickup system 200 is of a reduced size and a shorter optical path to travel. This is achieved by utilizing a pair of glass substrates 210, 212, thereby allowing integrating the reflection twin focusing beam splitter 150 in the prior art integrated optical pickup system 100 to be integrated on the second glass substrate 212, reducing the optical components integrated on top of the first glass substrate 210, which will, in turn, reduce the optical path the light beam must travel, resulting in an overall size reduction of the system.

Even though the present invention has been described with reference to the optical pickup system integrated therein its various optical components on a pair of glass substrates and a preferred embodiment only, the idea presented above can be extended to an optical system for reading an information signal, which is used for detecting a specific position of an object capable of reflecting a light beam impinging thereon.

While the present invention has been described with respect to the preferred embodiments, other modifications and variations may be made without departing from the spirit and scope of the present invention as set forth in the following claims.

What is claimed is:

1. An optical system for detecting an information signal, wherein the information signal is used for detecting the position of an object, comprising:

a first optical guide means having a bottom surface for impinging a converged light beam onto a specific point of the object and collimating the converged light beam after being reflected from the specific point;

a second optical guide means having a top and bottom surfaces for dividing the collimated light beam from the first optical guide means into a first and a second divided light beams, wherein the bottom surface of the first optical guide means is coupled to the top surface of the second optical guide means;

a twin focusing beam splitter, integrated on the bottom surface of the second optical guide means, for generating the first and the second divided light beams, wherein the twin focusing beam splitter includes a first and a second part, each part having a separate focal point proximate the top surface of the second optical guide means; and detecting means provided with a first and a second photoelectric cells for receiving the first and the second divided light beams, respectively, each of the photoelectric cells being positioned at the top surface of the second optical guide means at the separate focal points, the detecting means being provided only on the second substrate optical guide means.

2. An integrated optical pickup system for reproducing an information signal stored on a recording surface of an optical disk, comprising:

a first substrate having a top surface and a bottom surface;

a second substrate having a top surface and a bottom surface, said top surface of said second substrate being coupled to said bottom surface of said first substrate;

a semiconductor laser for generating a beam of light within the first substrate;

a first lens positioned to reflect, within the first substrate, said beam of light in a direction away from said semiconductor laser;

a reflection layer positioned to reflect, within the first substrate, the beam reflected by the first lens in a direction away from said first lens and said semiconductor laser;

a second lens arranged to converge the beam reflected by said reflection layer onto a recording surface of said optical disk, said recording surface reflecting said beam back through the second lens, whereat said beam is collimated and directed back towards said reflection layer in a direction towards said semiconductor laser, said beam passing through a thickness of said first substrate, passing at least partially through said reflection layer, and entering the second substrate;

a beamsplitter placed in the second substrate only, said beamsplitter arranged to reflect and split the collimated beam into first and second divided light beams, said divided light beams traveling in a direction towards said semiconductor laser; and a detector comprising first and second photoelectric cells, arranged to receive said first and second divided light beams.

3. The integrated optical pickup system of claim 2, wherein said semiconductor laser and reflection layer are placed at the bottom surface of said first substrate, and said first and second lenses are placed at the top surface of the first substrate.

4. The integrated optical pickup system of claim 3, wherein said beam splitter is placed at the bottom surface of the second substrate, and said first and second photoelectric cells are spaced apart from one another and are placed at the top surface of the second substrate.

5. An integrated optical pickup system for reproducing an information signal stored on a recording surface of an optical disk, comprising:

a first glass substrate, having a top and a bottom surfaces, for impinging a converged light beam onto the recording surface and collimating the converged light beam after being reflected from the recording surface, wherein the top surface of the first glass substrate is in a facing relation with the optical disk;

a second glass substrate having a top and a bottom surfaces, wherein the bottom surface of the first glass substrate is coupled to the top surface of the second glass substrate;

a twin focusing beam splitter, integrated on the bottom surface of the second glass substrate, for splitting the collimated light beam transmitted through the first glass substrate into a first and a second divided light beams, wherein the twin focusing beam splitter includes a first and a second parts, each of the parts having a separate focal point proximate the top surface of the second glass substrate; and a detector provided with a first and a second photoelectric cells integrated on the top surface of the second glass substrate, wherein each of the photoelectric cells is placed at each of the separate focal points of the parts of the twin focusing beam splitter, respectively, thereby allowing the integrated optical pickup system to read the information signals off the recording surface of the optical disk, the detector being provided only on the second substrate.

6. The integrated optical pickup system of claim 5, wherein the twin focusing beam splitter is capable of reflecting the collimated light beam transmitted through the first glass substrate.

7. The integrated optical pickup system of claim 5, further comprising a semiconductor laser for generating a light beam to read the optical disk, said semiconductor laser being attached to the bottom surface of the first glass substrate.

8. An integrated optical pickup system for reproducing an information signal stored on a recording surface of an optical disk, comprising:

a first glass substrate, having a top and a bottom surface, for impinging a converged light beam onto the recording surface and collimating the converged light beam after being reflected from the recording surface, wherein the top surface of the first glass substrate is in a facing relation with the optical disk;

a second glass substrate having a top and a bottom surface, wherein the bottom surface of the first glass substrate is coupled to the top surface of the second glass substrate;

a twin focusing beam splitter, integrated on the bottom surface of the second glass substrate, for splitting the collimated light beam transmitted through the first glass substrate into a first and a second divided light beams, wherein the twin focusing beam splitter includes a first and a second part, each of the parts having a separate focal point; and a detector provided with a first and a second photoelectric cells, wherein each of the photoelectric cells is placed at each of the separate focal points of the parts of the twin focusing beam splitter, respectively, thereby allowing the integrated optical pickup system to read the information signals off the recording surface of the optical disk;

wherein the first glass substrate includes:

a semiconductor laser for generating a light beam, wherein the semiconductor laser is attached to a predetermined position on the bottom surface of the first glass substrate;

an optical device for reflecting a portion of the light beam, wherein the optical device is formed on the bottom surface of the first glass substrate at a predetermined distance away from the semiconductor laser;

a reflection lens, integrated on the top surface of the first glass substrate, wherein the reflection lens is in a facing relationship with the semiconductor laser and the optical device, respectively; and an objective lens for converging the light beam and collimating the converged light beam after being reflected from a recording surface, wherein the objective lens is integrated on the top surface of the first glass substrate in a facing relation with the recording surface of the optical disk to thereby generate the converged light beam.

9. The integrated optical pickup system of claim 8, wherein the twin focusing beam splitter is in a facing relationship with the detector and the optical device, respectively.

10. The integrated optical pickup system of claim 9, wherein the optical device is made to transmit a portion of the collimated light beam from the objective lens to the twin focusing beam splitter.

11. An integrated optical pickup system for reproducing an information signal stored on a recording surface of an optical disk, comprising:

a first optical guide means for impinging a converged light beam onto the recording surface and collimating the converged light beam after being reflected from the recording surface;

a second optical guide means having a detector integrated therein for guiding the collimated light beam from the first optical guide means to the detector, thereby allowing the integrated optical pickup system to reproduce the information signal off the recording surface of the optical disk;

a light source arranged to generate said light beam and introduce said light beam into the first optical guide means; and a twin focusing beamsplitter provided on the second optical guide means;

wherein a top surface of the second optical guide means is coupled to a bottom surface of the first optical guide means, and said light beam travels, within the first optical guide means, in a direction away from said light source as it travels to the recording surface, and travels, within the second optical guide means, in a direction towards the light source as it travels to the detector, said light beam being split only on the way towards the detector.

12. The integrated optical pickup system of claim 11, wherein the first optical guide means includes:

a first optical coupler for collimating a light beam impinging thereon;

an optical device for reflecting a portion of the collimated light beam; and a second optical coupler for converging the reflected light beam on the recording surface of the optical disk to thereby generate the converged light beam.

13. The integrated optical pickup system of claim 12, wherein the optical device is integrated on bottom of the first optical guide means in a facing relationship with the first and the second optical couplers which are integrated on top of the first optical guide means being apart each other.

14. An integrated optical pickup system for reproducing an information signal stored on a recording surface of an optical disk, comprising:

a first optical guide means for impinging a converged light beam onto the recording surface and collimating the converged light beam after being reflected from the recording surface; and a second optical guide means, a detector integrated therein, for guiding the collimated light beam from the first optical guide means to the detector, thereby allowing the integrated optical pickup system to reproduce the information signal off the recording surface of the optical disk;

wherein the first optical guide means includes:

a first optical coupler for collimating a light beam impinging thereon;

an optical device for reflecting a portion of the collimated light beam; and a second optical coupler for converging the reflected light beam on the recording surface of the optical disk to thereby generate the converged light beam;

wherein the optical device is integrated on a bottom of the first optical guide means in a facing relationship with the first and the second optical couplers which are integrated on top of the first optical guide means being apart from each other;

and wherein the optical device is made to transmit a portion of the light beam impinging thereon after first being reflected from the optical disk and then being collimated by passing through the second optical coupler.

15. The integrated optical pickup system of claim 14, wherein the second optical guide means includes a third optical coupler, having a first and a second parts, for dividing the collimated light beam transmitted through the optical device into a first and a second divided light beams, wherein the third optical coupler is designed such that each parts of the third optical coupler has a separate focal point.

16. The integrated optical pickup system of claim 15, wherein the third optical coupler is integrated on bottom of the second optical guide means in a facing relationship with the detector and the optical device.

17. The integrated optical pickup system of claim 16, wherein the third optical coupler is capable of reflecting each of the divided light beams transmitted through the first optical guide means.

18. The integrated optical pickup system of claim 17, wherein the detector includes a first and a second photoelectric cells.

19. The integrated optical pickup system of claim 18, wherein each of the photoelectric cells of the detector has a reception surface being capable of measuring the intensity of a light beam detected thereon.

20. The integrated optical pickup system of claim 19, wherein said each of the photoelectric cells is placed at the corresponding focal point of the third optical coupler.

* * * * *